UNITED STATES PATENT OFFICE.

EDUARD HEPP, OF BIEBRICH-ON-THE-RHINE, GERMANY.

BLUE-RED DYE.

SPECIFICATION forming part of Letters Patent No. 466,826, dated January 12, 1892.

Application filed April 22, 1891. Serial No. 390,017. (Specimens.)

*To all whom it may concern:*

Be it known that I, EDUARD HEPP, a subject of the Emperor of Germany, residing at Biebrich-on-the-Rhine, Germany, have invented new and useful Improvements in Coloring-Matter, of which the following is a specification.

My invention has for its object the production of a trisulpho acid of the red basic coloring-matter of the formula $C_{28}H_{19}N_3$—viz., $C_{22}H_{14}(C_6H_5)N_3$, which, in the publications I made in collaboration with Otto Fischer, I first termed "rosinduline" (*Berichte der Deutsch. Chem. Ges.* 21 2621) and then phenyl-rosinduline (*Ann. d. Chem.* 256, 235,) this new denomination having been found necessary after the discovery of a less complicated body, $C_{22}H_{15}N_3$, belonging to the same class of products and the conversion of which into sulpho-acids will form the subject of another specification. Although the phenyl-rosinduline may be obtained by many methods, there are only two which have hitherto given a good result in practice. The one method consists in the action of aniline upon the chlorhydrate of benzine-azo-alpha-naphthylamine. (German Patent No. 45,370 of the Badische Anilin and Soda Fabrik, O. Fischer and E. Hepp, *Berichte der Deutsch. Chem. Ges.* 21, 680 *Ann. d. Chem.* 256,241.) The other process consists in treating the chlorhydrate of nitrosodimethyl-alpha-naphthylamine with aniline. (German Patent No. 50,822 of Kalle & Co., O. Fischer and E. Hepp. *Ann. d. Chem.* 256, 241.) If the so-called "melts" be well made, the product thus obtained does not need any further purification by means of chrystallization or by the separation of a monosulpho-acid.

To carry out my invention—that is to say, to convert the phenyl-rosinduline into the above-named trisulpho-acid—I proceed as follows: I introduce ten (10) parts of phenyl-rosinduline under continual stirring and cooling into thirty (30) parts of fuming sulphuric acid, containing about thirty per cent. of free anhydride, and I heat this mixture on a water-bath until a sample precipitated by means of water and filtered off becomes easily soluble in cold pure water. I then dilute the product with about double the quantity of water and precipitate the sodium salt of the trisulpho-acid by adding a concentrated solution of common salt. The dye-stuff thus separated is filtered, pressed, and dried. It dyes wool in an acidulated bath red-bluish shades. The free sulpho-acid is prepared from the salts by adding mineral acids to the concentrated solution of the salts. It is very easily soluble in cold water, but insoluble in diluted sulphuric (1:1) or hydrochloric (1:2) acid. The product crystallized from alcohol and dried for eight hours at 130° centigrade was proved by analysis to be a trisulpho-acid of the formula $C_{28}H_{16}N_3(SO_3H)_3$. The salts are also very easily soluble in water, but crystallize from a hot solution, to which common salt is added. Like the phenyl-rosinduline and its mono and disulpho acid the trisulpho-acid gives with concentrated sulphuric acid a bright-green solution.

What I claim as new, and desire to secure by Letters Patent, is—

The hereinbefore-described trisulpho-acid of the red basic coloring-matter termed "phenyl-rosinduline," which trisulpho-acid is represented by the formula $C_{28}H_{16}N_3(SO_3H)_3$, which is a red crystalline powder giving with concentrated sulphuric acid a strong green solution; it is very easily soluble in cold water, but completely insoluble in sulphuric acid or chlorhydric acid diluted with about the same quantity of water; its potassium, sodium, and ammonium salts are crystalline and very soluble in cold water and are precipitated from the aqueous solution by means of common salt and adapted to dye wool red-bluish shades.

In testimony whereof I have signed my name to this specification in the presence of two subscribing witnesses.

EDUARD HEPP.

Witnesses:
 FRANZ WIRTH,
 FRANZ HASSLACHER.